United States Patent [19]
Buondonno et al.

[11] Patent Number: 5,313,592
[45] Date of Patent: May 17, 1994

[54] METHOD AND SYSTEM FOR SUPPORTING MULTIPLE ADAPTERS IN A PERSONAL COMPUTER DATA PROCESSING SYSTEM

[75] Inventors: Michael F. Buondonno, Newtown, Pa.; Craig N. Kindell, Delray Beach, Fla.; Kenneth L. Milsted, Boynton Beach, Fla.; Brian E. Yoder, Boca Raton, Fla.

[73] Assignee: International Business Machines Corporation, Armonk, N.Y.

[21] Appl. No.: 918,473

[22] Filed: Jul. 22, 1992

[51] Int. Cl.$^5$ ............................................. G06F 13/00
[52] U.S. Cl. ..................................... 395/325; 364/231; 364/281.3; 364/281.4; 364/284.2; 364/DIG. 1
[58] Field of Search ............... 395/275, 325, 650, 425, 395/700; 235/379, 380; 370/54

[56] References Cited
U.S. PATENT DOCUMENTS

| | | | |
|---|---|---|---|
| 3,704,363 | 11/1972 | Salmassy et al. | 371/5.1 |
| 3,725,864 | 4/1973 | Clark et al. | 395/275 |
| 3,949,380 | 4/1976 | Barbour et al. | 395/275 |
| 4,591,973 | 5/1986 | Ferris, III et al. | 395/275 |
| 4,849,928 | 7/1989 | Hauck | 395/500 |
| 4,974,192 | 11/1990 | Face et al. | 395/275 |
| 4,982,323 | 1/1991 | Nakamura | 364/200 |
| 5,119,479 | 6/1992 | Arai et al. | 395/275 |
| 5,121,497 | 6/1992 | Kerr et al. | 395/650 |

*Primary Examiner*—Michael R. Fleming
*Assistant Examiner*—Gopal C. Ray
*Attorney, Agent, or Firm*—Duke W. Yee; Andrew J. Dillon

[57] ABSTRACT

The present invention provides a method and system for providing communication between a number of applications and a number of devices disposed in various relative locations in a data processing system through an interface that is capable of accessing only a single device at a prespecified relative location. The applications are concurrently executing within the data processing system. A device table is established for each of the applications, wherein each device table includes device parameter information and device address information for each of the devices in the data processing system. A particular device is specified for use with a selected application. Device parameter information and device address information for the prespecified relative location within the device table established for the application are overwritten with device parameter information and device address information for the particular device specified. Data is then directed from a particular application to a selected device utilizing the device parameter information and device address information stored within the device table for the particular application.

11 Claims, 5 Drawing Sheets

METHOD AND SYSTEM FOR SUPPORTING MULTIPLE ADAPTERS IN A PERSONAL COMPUTER DATA PROCESSING SYSTEM

BACKGROUND OF THE INVENTION

1. Technical Field

The present invention relates in general to a method and system for providing an access to an adapter, and in particular to a method and system for providing an application access to an adapter located in a data processing system. Still more particularly, the present invention relates to a method and system for providing multiple applications access to multiple adapters in a multitasking environment within a data processing system.

2. Description of the Related Art

Multimedia, the presentation or transfer of information through more than one medium at any time, is a fast growing segment of the computer industry with many applications being developed incorporating various features of multimedia. Additionally, many businesses are utilizing multimedia to present information to consumers. For example, video rental stores may desire to present previews of movies to customers in the store. Previews of movies may be stored in digital format for play back to customers. In multimedia presentations involving the previewing of movies, it is desirable to have the capability to present these previews to as many people as possible. Multiple preview stations utilizing a monitor or remote television may be utilized to provide numerous previews.

Although multimedia presentations may be desirable, the costs of providing multiple preview stations may not be cost effective when each single preview station requires its own data processing system to present a preview. In such a situation, multiple preview stations driven by a single data processing system may be utilized to provide multiple previews to reduce overall system costs.

Many of the presently available multimedia applications, however, do not provide the ability to drive more than one preview station at a time in a multitasking mode. For example, the audio-video software kernel ("AVK") produced through a joint development effort between International Business Machines Corporation ("IBM") Intel Corporation ("Intel"), and the IBM PS/2 ActionMedia II Display Adapter/A ("ActionMedia II") may be utilized in a data processing system such as an IBM PS/2 Ultimedia Model M57 SLC ("Ultimedia") computer to provide real time video presentations at a presentation station. PS/2 is a registered trademark of IBM and ActionMedia is a trademark of Intel. The AVK provides interfaces utilized by an application to access various adapters and perform various function. The AVK, however, is unable to drive multiple preview stations in a multitasking mode. In other words, two applications are unable to provide real time digital video presentations at two different preview stations utilizing two ActionMedia II boards at the same time. Currently, each preview station must have an Ultimedia computer to provide previews.

Therefore, it would be desirable to have a method and system for providing applications executing concurrently in a data processing system access to multiple adapters.

SUMMARY OF THE INVENTION

It is therefore one object of the present invention to provide a method and system for providing an access to an adapter.

It is another object of the present invention to provide a method and system for providing an application access to an adapter located in a data processing system.

It is yet another object of the present invention to provide a method and system for providing multiple applications access to multiple adapters in a multitasking environment within a data processing system.

The foregoing objects are achieved as is now described. The present invention provides a method and system for providing communication between a number of applications and a number of devices disposed in various relative locations in a data processing system through an interface that is capable of accessing only a single device at a prespecified relative location. The applications are concurrently executing within the data processing system. A device table is established for each of the applications, wherein each device table includes device parameter information and device address information for each of the of devices in the data processing system. A particular device is specified for use with a selected application. Device parameter information and device address information for the prespecified relative location within the device table established for the application are overwritten with device parameter information and device address information for the particular device specified. Data is then directed from a particular application to a selected device utilizing the device parameter information and device address information stored within the device table for the particular application.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
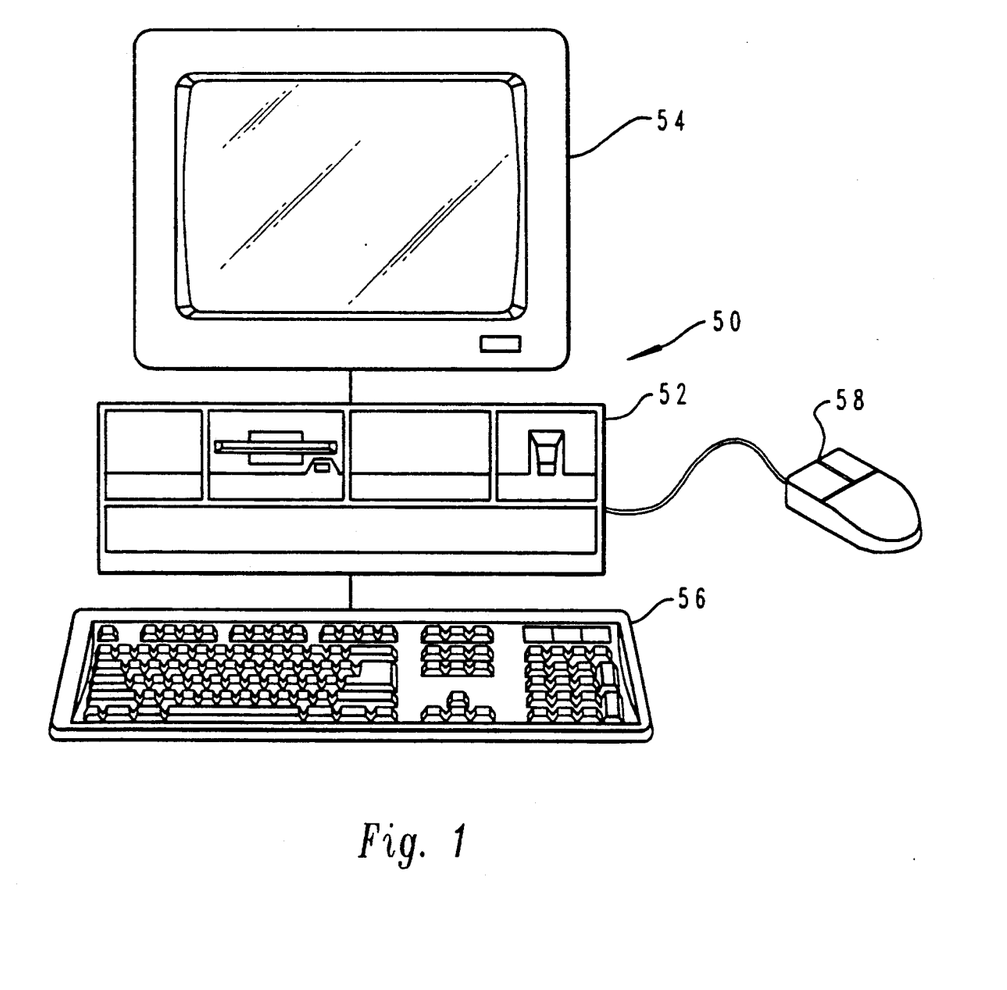
FIG. 1 depicts a pictorial representation of a computer system in which the present invention may be implemented in accordance with a preferred embodiment of the present invention.

With reference now to the figures and in particular with reference to FIG. 1, there is depicted a pictorial representation of a computer system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation. PS/2 is also a registered trademark of International Business Machines Corporation. Although the depicted embodiment involves a personal computer, a preferred embodiment of the present invention may be implemented in other types of data processing systems, such as for example, intelligent work stations or mini-computers. Computer 50 may be implemented utilizing any suitable computer such as the IBM PS/2 computer, a product of International Business Machines Corporation. PS/2 is a registered trademark of International Business Machines Corporation. In particular, an IBM PS/2 Ultimedia Model M57 SLC ("Ultimedia") computer may be employed.

Figure 2:
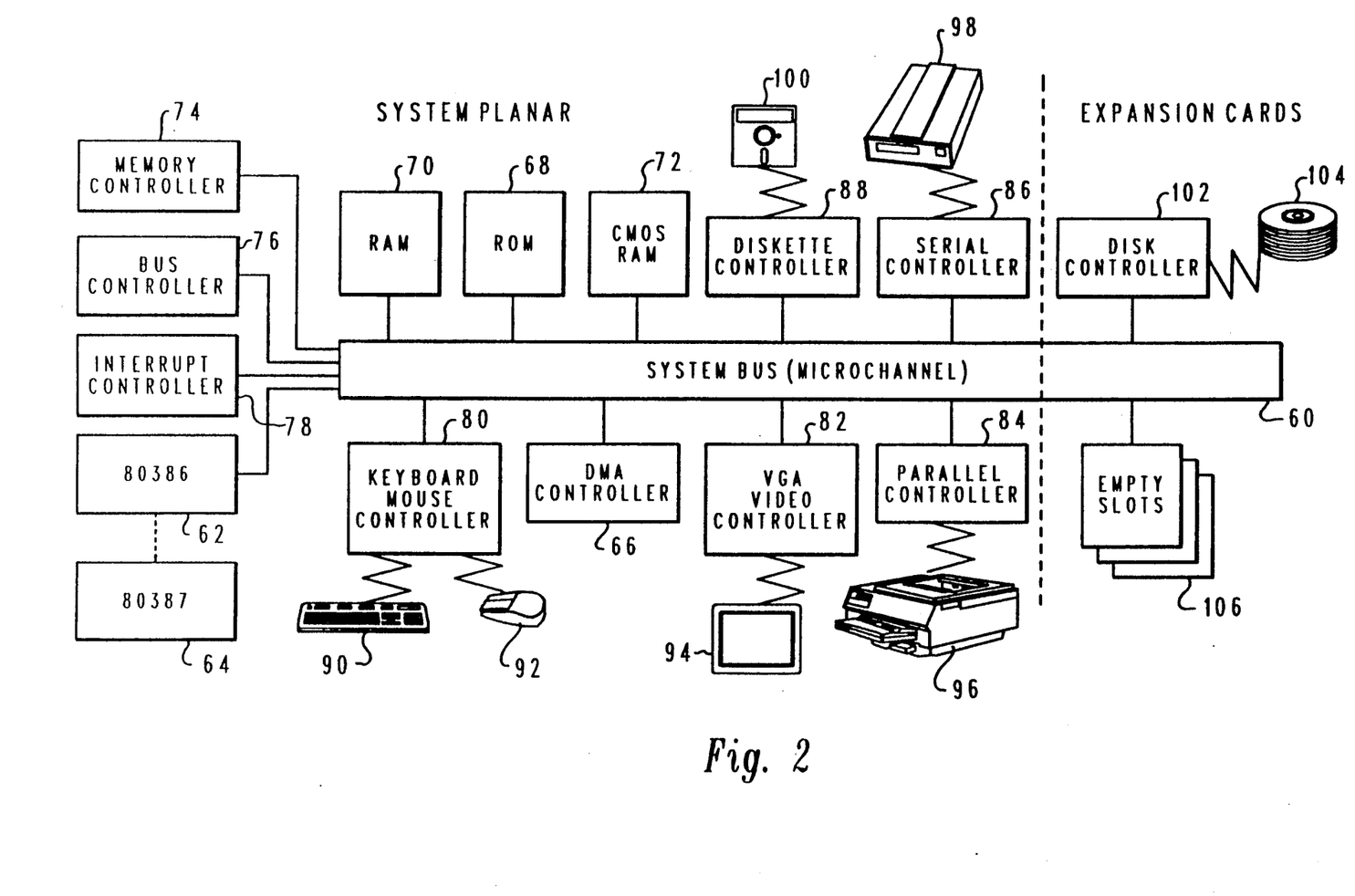
FIG. 2 is a block diagram of selected components in personal computer in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. DMA controller 66 is also connected to system bus 60 and allows various devices to appropriate cycles from microprocessor 62 during large I/O transfers.

Read only memory ("ROM") 68 is mapped into the microprocessor 62 address space in the range from 640K to 1 megabyte. Read Only Memory ("ROM") 68 and Random Access Memory ("RAM") 70 are also connected to system bus 60. ROM 68 contains the power-on self test ("POST") and the Basic Input/Output System ("BIOS") which control hardware operations, such as those involving disk drives and the keyboard. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output ("I/O") controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Various multimedia adapters may be added to an Ultimedia computer to enhance multimedia capabilities. In particular an IBM PS/2 ActionMedia II Display Adapter/A ("ActionMedia II"), a product available from IBM, may be placed in one of empty slots 106 to provide digital video support for video presentations from digital video files.

Such a computer system may support an ActionMedia II adapter with an AVK available from IBM. More information on the application programming interface, AVK, for the ActionMedia II adapter may be found by reference to *ActionMedia II Application Programmer's Guide*, part no. 04G3226, available from IBM. Other available reference guides include: *BM PS/2 ActionMedia II Technical Reference*, part no. 92F2729; *IBM PS/2 ActionMedia II Display Adapter/A: Installation Instructions*, part no. 92F2726; *IBM PS/2 ActionMedia II Maintenance Library*, part no. 92F2728; *IBM PS/2 ActionMedia II Capture Option: Installation*, part no. 92F2727, available from IBM.

One example of a multitasking environment in which a preferred embodiment of the present invention may be implemented is OS/2 which is a product of IBM. OS/2 is a registered trademark of IBM. OS/2 is an operating system that provides multitasking capability to data processing systems. More information on OS/2 may be found in the text book by Deitel and Kogan entitled *The Design of OS/2*, Addison-Wesley, 1992.

Digital video presentations may be provided utilizing an Ultimedia computer with an ActionMedia II adapter. As mentioned before, the presently available AVK software provides interfaces to play digital video files, but the interfaces limit this use to only one ActionMedia II adapter or board, identified as board 0. The board numbers are assigned by their relative positions in the slots and not by the actual slot number. Thus, if slot 0 is empty and the first board is in slot 1, the board in slot 1 would be designated as board 0. In accordance with a preferred embodiment of the present invention, a method and system is provided to allow multiple applications in a multitasking environment to each have access to an ActionMedia II board.

In accordance with a preferred embodiment of the present invention, each application in a multitasking environment may access a different adapter in a data processing system that provides a software interface for utilizing only one adapter within the data processing system.

With the AVK, a hardware interface driver ("HWD") is utilized to allow an application to access an adapter. In accordance with a preferred embodiment of the present invention a method and system is provided to allow each application in a multitasking environment to tell the AVK that the adapter or board number is 0, while the HWD actually represents another board.

First, a programmer desiring to having multiple applications or instances of an application, presenting digital video images, running at the same time may call a subroutine to define which board should be utilized in accordance with a preferred embodiment of the present invention. Each instance of the application passes the board number and the device driver name to the subroutine. Afterward, each instance of the application need only call board 0. Calls are made to the existing AVK interface, and whenever the AVK needs a board number, the application specifies 0. In accordance with a preferred embodiment of the present invention, subroutine is utilized to ensure the board initially specified is employed.

In accordance with a preferred embodiment of the present invention, HwdEnvDefine ("HED") is a subroutine utilized to receive data from each instance of an application. The data is device information, which includes the number of the actual board to utilize, the name of the device driver associated with the board, device parameter information and other device address information.

In accordance with a preferred embodiment of the present invention, HwdOpen ("HO") is a subroutine utilized to open the device driver stored by HED, and HwdEnvInit ("HEI") is a subroutine employed to store the board data received by HED in a device table slot that is utilized for board 0.

Figure 3:
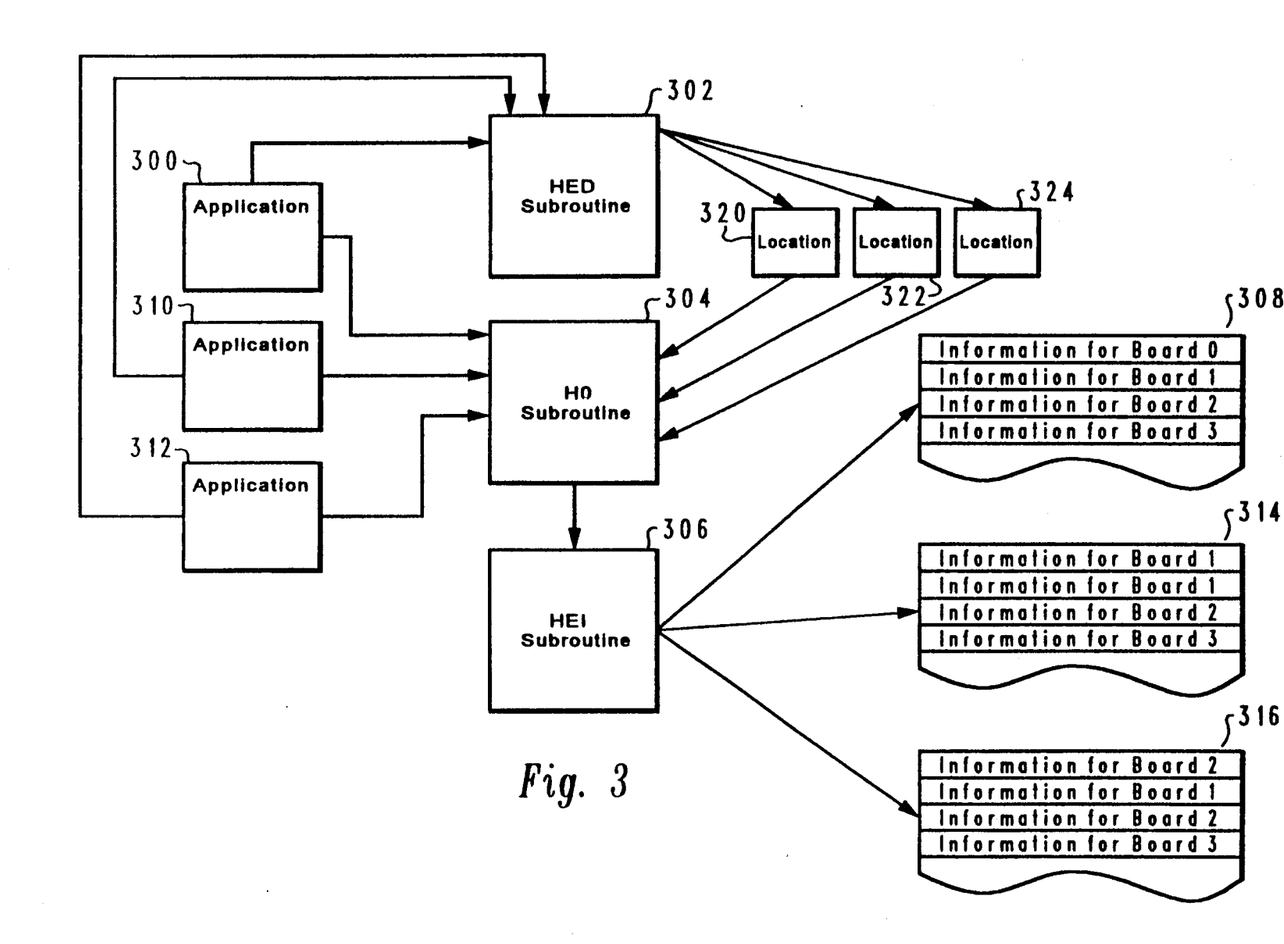
FIG. 3 depicts a block diagram illustrating the creation of several instances of a device table in accordance with a preferred embodiment of the present invention.

With reference now to FIG. 3, there is depicted a block diagram illustrating the creation of several instances of a device table in accordance with a preferred embodiment of the present invention. The AVK duplicates data for each ActionMedia II board while only one copy of the executable code is in the data processing system. Each instance of an application is associated with a device table. The device table includes information on all of the devices in the slots within the data processing system.

Application 300 makes a request for a particular ActionMedia II board, which is relayed to HED subroutine 302, which stores information, including board number and device driver name, in location 320, sent from application 300. The information received by HED subroutine 302 and stored in location 320 is utilized by HO subroutine 304 to open the device driver specified by application 300 when application 300 sends a request to HO subroutine 302 to open a device driver. Next, HEI subroutine 306 is utilized to create device table 308, which is associated with application 300. Similarly, applications 310 and 312 also may send a request for a ActionMedia II board to HED subroutine 302, resulting in information including the board number and device driver name being stored in locations 322 and 324. Afterward, applications 310 and 312 may send a request to HO subroutine 304 to have the device driver specified opened. Thereafter, HEI subroutine 306 fills in information in device tables 314 and 316 from information stored in locations 322 and 324. The information in the entry for board zero is overwritten with the desired board information. Each instance of a device table is created when an application is initiated.

Figure 4:
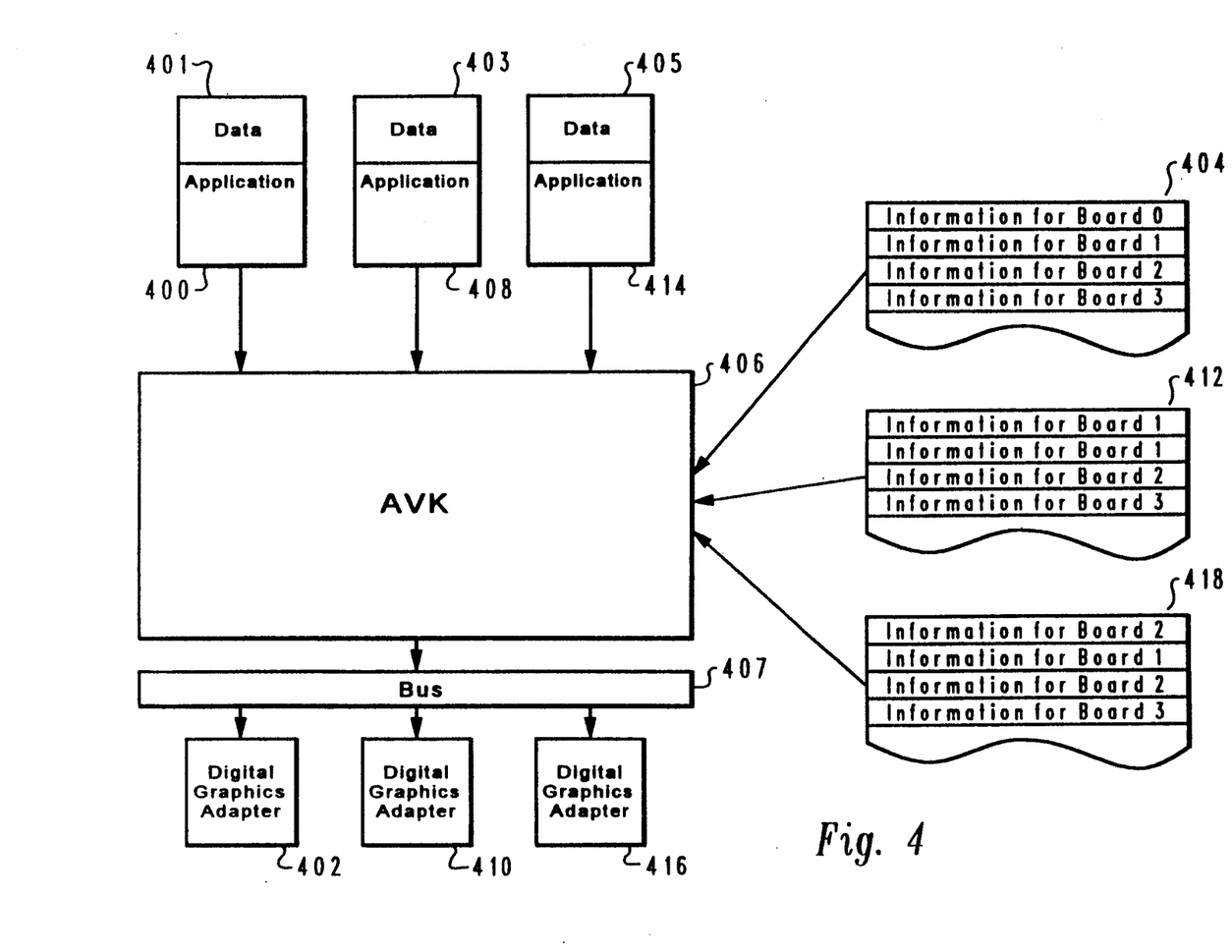
FIG. 4 is a block diagram illustrating the relationship between various applications and the AVK in accessing a digital graphics adapter in accordance with a preferred embodiment of the present invention.

Referring to FIG. 4, there is depicted a block diagram illustrating the relationship between various applications and the AVK in accessing a digital graphics adapter in accordance with a preferred embodiment of the present invention. Application 400 may access and send data 401 to digital graphics adapter 402, which is board 0 located in slot 0, by sending data 401 to board zero. Application 400 is associated with device table 404. Each instance of a device table contains an entry for each board or adapter in the data processing system with the first board being labeled board 0 in the device table. Although all boards are stored in each device table, the AVK utilizes only the information in the entry for board 0 in sending data to a digital graphics adapter. When application 400 sends data 401 for display on digital graphics adapter 402, AVK 406 utilizes information in the entry for board 0 in device table 404 to send data 401 across bus 407 to digital graphics adapter 402.

Application 408 may access and send data 403 to digital graphics adapter 410, which is board 1 located in slot 1, by sending data 403 to board 0. Application 408 is associated with device table 412. Application 408 directs data 403 to digital graphics adapter 410 for display to board 0. Data 403 is sent to AVK 406, which accesses device table 412, resulting in the data 403 being sent to digital graphics adapter 410 across bus 407. Although application 408 directs data 403 for display to board 0, the information is directed to digital graphics adapter 410, board 1, since the data for this board has been stored in the entry for board 0 in device table 412.

Similarly, application 414 may send data 405 to digital graphics adapter 416, which is board 2, located in slot 2 even though data 405 is directed to board 0. Such access is possible even through digital graphics adapter 416 is actually board two in the data processing system, since application 414 is associated with device table 418, which contains the information for digital graphics adapter 416 and its device driver located in the entry for board 0.

An application that utilizes a board other than board zero calls the hardware environment definition subroutine before making any other calls to the AVK in accordance with a preferred embodiment of the present invention. The application passes the board number and device driver name to this subroutine. Afterward, the application makes calls to the AVK interface, and whenever the AVK needs a board number, the application specifies zero as the board number.

In the depicted embodiment, the digital graphics adapters 402, 410, and 416 are located in slots 0, 1, and 2 respectively. The adapter could also be placed in other slots, such as, for example, in slots 2, 4, and 7. The board numbers would remain the same. Board numbers are determined by their relative positions in the slots and not by their actual slot numbers in the depicted embodiment. It is contemplated that in other data processing systems that the fashion in which boards may be assigned identifiers may vary.

Figure 5:
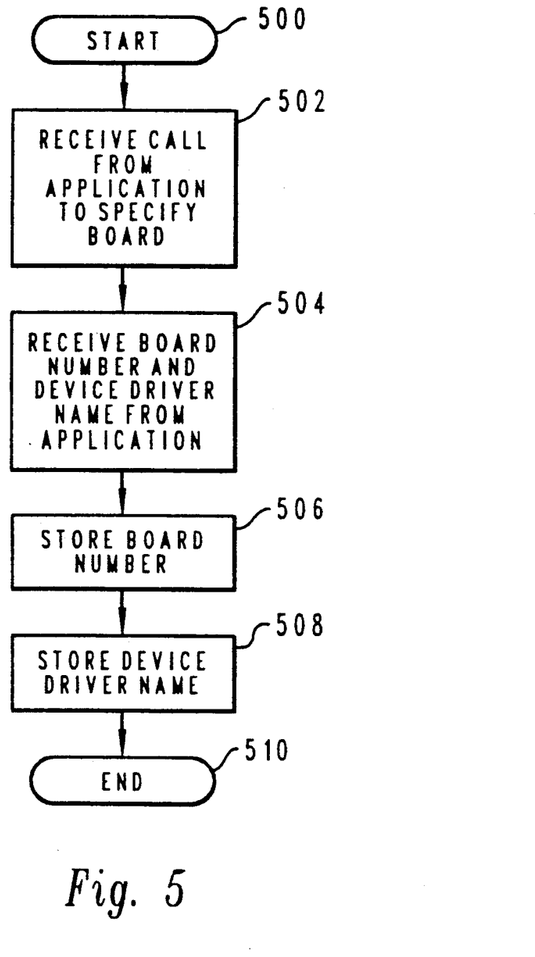
FIG. 5 depicts a high level flowchart of a method and system for an application to select a digital graphics board in accordance with a preferred embodiment of the present invention.

With reference to FIG. 5, there is depicted a high level flowchart of a method and system for an application to select a digital graphics board in accordance with a preferred embodiment of the present invention. As illustrated, the process begins in block 500 and thereafter proceeds to block 502, which depicts the receiving of a call from an application to specify a board. The process then proceeds to block 504, which illustrates the receiving of a board number and device driver name from the application. Thereafter, the process proceeds to block 506, which depicts the storing of the board number. Afterward, the process proceeds to block 508, which illustrates the storing of the device driver name. The process then terminates as illustrated in block 510. The term "process" in the flowchart descriptions is utilized to describe the flow in the flowcharts and not to describe a process within OS/2.

In accordance with a preferred embodiment of the present invention, the board number and device driver name for the actual board to be utilized is stored by the hardware environment definition subroutine, HED. If this function is not called, the original board number (0) and the original device driver name are left intact as defaults.

Figure 6:
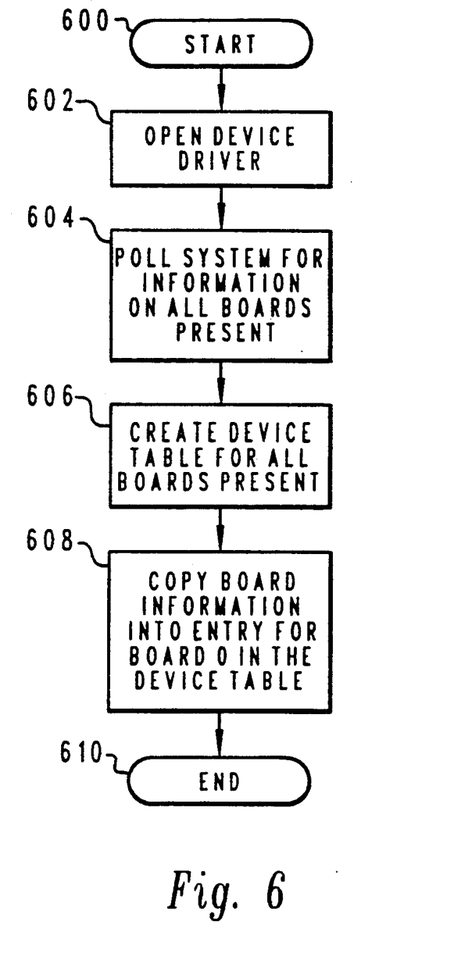
FIG. 6 is a high level flowchart of a method and system for changing device information in a device

Referring now to FIG. 6, there is depicted a high level flowchart of a method and system for changing device information in a device table in accordance with a preferred embodiment of the present invention. As illustrated, the process begins in block 600, and thereafter proceeds to block 602, which depicts the opening of the device driver stored in block 508 of FIG. 5. Thereafter, the process proceeds to block 604, which illustrates polling the data processing system for information on all of the boards present within the data processing system. Afterward, the process proceeds to block 606, which illustrates the creating of a device table for all of the boards present within the data processing system. The process then proceeds to block 608, which illustrates the copying of board information into the entry for board zero in the device table. In essence, the device or board information in the entry for board zero is overwritten with the device information for the board selected by the application. Thereafter, the process terminates as illustrated in block 610.

In accordance with a preferred embodiment of the present invention, the AVK does not use global data in order to allow multiple instances (multiple applications) to utilize multiple boards at the same time in a multitasking environment. Each application has a device table associated with it. In accordance with a preferred embodiment of the present invention, the applications accessing the AVK utilizing the present invention may be different applications presenting digital video information or may be instances of the same application.

In accordance with a preferred embodiment of the present invention, a single data processing system may be enabled to utilize more than one adapter. The present invention also provides reducing the time necessary to develop applications to run in a multiple board environment since the existing AVK interfaces are unchanged. A new application need only call the hardware environment definition subroutine to tell the AVK which board should be utilized. Afterward, all calls are made to the AVK interfaces as if the application were utilizing board zero.

As a result, a single data processing system, such as an Ultimedia computer, may utilize more than one adapter, i.e., an ActionMedia II board, and, thus lowering the cost of multimedia presentation systems, such as those for previewing movies in video rental stores. Additionally, only one copy of an AVK is needed in accordance with a preferred embodiment of the present invention. Only the data is duplicated for each application or instance of an application. Each application modifies the data in the device table to access the appropriate adapter.

Although the depicted embodiment utilizes a digital graphics adapter with an AVK as an example, the present invention may be utilized with many other applications and adapters known to those skilled in the art.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for providing communication between a plurality of application software and a plurality of devices disposed in a plurality of relative locations through an interface capable of accessing only a single device at a prespecified relative location, wherein said plurality of application software is concurrently executing within said data processing system, said method comprising:
    establishing a device table for each of said plurality application software, wherein each device table includes device parameter information and device address information for each of said plurality of devices at a plurality of relative locations, including said prespecified relative location;
    specifying a particular device for use with a selected application software;
    overwriting device parameter information and device address information for said single device at said prespecified relative location within said device table established for said selected application software with device parameter information and device address information for said particular device, wherein said device parameter information and said device address information overwritten in said prespecified relative location in said device table established for said selected application may be utilized by said interface capable of accessing only a single device at a prespecified relative location to provide communication between said selected application software and said particular device; and
    directing data from said selected application software to said particular device utilizing said device parameter information and device address information stored within said device table for said selected application software.

2. The method of claim 1, wherein said step of specifying a particular device for use with a selected application software includes specifying a digital video adapter.

3. The method of claim 1, wherein said step of establishing a device table for each of said plurality of application software includes device parameter information and device address information as a board number and a device driver name.

4. A data processing system for providing communication between a plurality of application software and a plurality of devices disposed in a plurality of relative locations through an interface capable of accessing only a single device at a prespecified relative location, wherein said plurality of application software is concurrently executing within said data processing system, said data processing system comprising:
    an interface capable of accessing only a single device at a prespecified relative location;
    means for establishing a device table for each of said plurality application software, wherein each device table includes device parameter information and device address information for each of said plurality of devices at a plurality of relative locations, including said prespecified relative location;
    means for specifying a particular device for use with a selected application software;
    means for overwriting device parameter information and device address information for said single device at said prespecified relative location within said device table established for said selected application software with device parameter information and device address information for said particular device, wherein said device parameter information and said device address information overwritten at said prespecified relative location may be utilized by said interface to provide communication between said selected application software and said particular device; and means for directing data from said selected application software to said particular device utilizing said device parameter information and device address information stored within said device table for said selected application software.

5. The data processing system of claim 4, wherein said interface is an audio-video kernel.

6. The data processing system of claim 4, wherein said device is a digital video adapter.

7. The data processing system of claim 4, wherein said device parameter information and device address information includes a board number and a device driver name.

8. A data processing system comprising:
a plurality of devices;
a plurality of application software concurrently executing within said data processing system, wherein said plurality of application software communicate with a plurality of devices in a plurality of relative locations;
a interface capable of accessing only a single device at a prespecified relative location;
means for establishing a device table including device parameter information and device address information for each of said plurality of devices at a number of relative locations, including the prespecified relative location used by said interface;
means for specifying a particular device for use with a selected application software;
means for overwriting device parameter information and device address information for said single device at said prespecified relative location with device parameter information and device address information for said particular device in said device table for said selected application software; and
means for directing data from said selected application software to said particular device utilizing said device parameter information and device address information overwritten at said prespecified relative location in said device table for said selected application software, wherein said plurality of application software may communicate with a plurality of devices in a plurality of relative locations utilizing said interface.

9. The data processing system of claim 8, wherein the interface is an audio-visual kernel.

10. The data processing system of claim 8, wherein said particular device is a digital video adapter.

11. The data processing system of claim 8, wherein the device parameter information and the device address information includes a board number and a device driver number.

* * * * *